US006772868B2

(12) United States Patent
Warner

(10) Patent No.: US 6,772,868 B2
(45) Date of Patent: Aug. 10, 2004

(54) RAILROAD RAIL-CONNECTOR ASSEMBLY

(75) Inventor: Roy K. Warner, Lehigh Acres, FL (US)

(73) Assignee: Pan Electric Corporation, Carson City, NV (US)

( * ) Notice: Subject to any disclaimer, the term of this patent is extended or adjusted under 35 U.S.C. 154(b) by 0 days.

(21) Appl. No.: 10/241,636

(22) Filed: Sep. 11, 2002

(65) Prior Publication Data

US 2003/0047400 A1 Mar. 13, 2003

Related U.S. Application Data

(60) Provisional application No. 60/318,788, filed on Sep. 13, 2001.

(51) Int. Cl.[7] .................................................. B60M 1/00

(52) U.S. Cl. ....................... 191/22 R; 19/23 R; 439/789

(58) Field of Search ............................ 191/22 R, 23 R, 191/29 R, 48, 29 DM, 32; 439/789, 836, 787, 798, 883, 807, 877; 238/14.05, 14.02, 14.16

(56) References Cited

U.S. PATENT DOCUMENTS

| | | | | | |
|---|---|---|---|---|---|
| 318,182 | A | | 5/1885 | Guhl | |
| 876,489 | A | * | 1/1908 | Rappleye et al. | 191/22 R |
| 879,940 | A | | 2/1908 | Blood, Jr. | |
| 945,502 | A | * | 1/1910 | Enequist | 191/22 R |
| 1,679,677 | A | | 8/1928 | Milne | |
| 2,370,748 | A | | 3/1945 | O'Donnell | |
| 2,452,406 | A | | 10/1948 | Volkery et al. | |
| 2,700,807 | A | | 2/1955 | Peterson | |
| 2,915,275 | A | | 12/1959 | Korka | |
| 3,019,409 | A | | 1/1962 | Sarafinas | |
| 3,138,422 | A | | 6/1964 | Lawlor | |
| 3,169,818 | A | | 2/1965 | Tracy | |
| 3,351,889 | A | | 11/1967 | Lawlor et al. | |
| 3,437,979 | A | | 4/1969 | Beaudion | |
| 3,537,150 | A | | 11/1970 | Emberson | |

(List continued on next page.)

FOREIGN PATENT DOCUMENTS

| | | |
|---|---|---|
| AT | 77339 | 7/1919 |
| GB | 147455 | 8/1921 |
| GB | 529520 | 11/1940 |
| GB | 0563909 | 9/1944 |
| GB | 1145085 | 3/1969 |
| GB | 1188953 | 4/1970 |
| GB | 2 287 839 A | 9/1995 |
| WO | WO 95/25361 | 9/1995 |

OTHER PUBLICATIONS

AMP Inc., AMPACT AMP Wrench–Lok, Amp Miniwedge Connectors, (1995).

(List continued on next page.)

*Primary Examiner*—Frantz F. Jules
(74) *Attorney, Agent, or Firm*—Brinks Hofer Gilson & Lione

(57) ABSTRACT

A railroad rail is electrically and mechanically connected to a power conductor by an electrical connector that includes a first connector part having a first tail that is bolted to the web of the railroad rail, a socket, and a first opening in the socket. The connector also includes a second connector part having a second tail, a head rotatably received in the socket, and a second opening in the head. The second connector part is rotatable in the socket between an open position, in which the first and second openings are aligned to allow a power conductor to be inserted into the connector, and a clamped position, in which the first and second openings are partially misaligned to clamp the electrical conductor in place. A fastener passes through the first and second tails to hold the second connector part in the clamped position.

6 Claims, 2 Drawing Sheets

U.S. PATENT DOCUMENTS

| | | | | | |
|---|---|---|---|---|---|
| 3,801,952 | A | | 4/1974 | Lawlor | |
| 3,831,134 | A | * | 8/1974 | Cornell et al. | 439/789 |
| 3,861,771 | A | | 1/1975 | Cornell | |
| 3,879,104 | A | | 4/1975 | Shugarman et al. | |
| 3,883,211 | A | * | 5/1975 | Shugarman et al. | 439/789 |
| 3,892,455 | A | | 7/1975 | Sotolongo | |
| 3,973,821 | A | | 8/1976 | Scott et al. | |
| 3,980,381 | A | | 9/1976 | Cornell | |
| 3,985,411 | A | | 10/1976 | Mooney et al. | |
| 3,990,129 | A | | 11/1976 | Cornell et al. | |
| 4,001,921 | A | | 1/1977 | Lawlor et al. | |
| 4,014,078 | A | | 3/1977 | Cornell et al. | |
| 4,097,169 | A | | 6/1978 | Kelly | |
| 4,126,918 | A | | 11/1978 | Cornell | |
| 4,128,294 | A | | 12/1978 | McCord | |
| 4,186,981 | A | | 2/1980 | Holton | |
| 4,357,068 | A | | 11/1982 | Cornell et al. | |
| 4,475,843 | A | | 10/1984 | Wyler | |
| 4,479,694 | A | | 10/1984 | Cornell et al. | |
| 4,526,428 | A | | 7/1985 | Sachs | |
| 4,548,462 | A | | 10/1985 | Cornell | |
| 4,693,688 | A | * | 9/1987 | Cembruch et al. | 439/877 |
| D296,777 | S | | 7/1988 | Cornell | |
| 4,826,078 | A | * | 5/1989 | Arvin et al. | 238/14.14 |
| 4,861,290 | A | | 8/1989 | Halmstad et al. | |
| 4,898,551 | A | | 2/1990 | Cornell | |
| 5,401,194 | A | | 3/1995 | Cornell | |
| 5,466,176 | A | | 11/1995 | Cornell et al. | |
| 5,690,516 | A | | 11/1997 | Fillinger | |
| 5,765,962 | A | | 6/1998 | Cornell et al. | |
| 5,919,065 | A | | 7/1999 | Warner et al. | |
| 6,244,517 | B1 | * | 6/2001 | Courtois et al. | 238/14.05 |
| 6,325,677 | B1 | * | 12/2001 | Tamm | 439/789 |
| 6,347,967 | B1 | | 2/2002 | Tamm | |

OTHER PUBLICATIONS

Eritech, Inc., "Ground Rod Accessories," pp. A1–9–A1–10, A2–1–A2–21 (1994).

Search Report for GB 0221340.3 dated Jan. 10, 2003.

U.S. Patent Application Ser. No. 09/551,280, filed Apr. 18, 2000.

U.S. Patent Application Ser. No. 09/664,909, filed Sep. 18, 2000.

U.S. Patent Application Ser. No. 10/091,715, filed Mar. 6, 2002.

* cited by examiner

RAILROAD RAIL-CONNECTOR ASSEMBLY

This application claims the benefit of U.S. Provisional Application Serial No. 60/318,788, filed Sep. 13, 2001, the entire disclosure of which is incorporated herein by reference.

BACKGROUND

This invention relates to a connector for mechanically and electrically connecting a power conductor to a railroad rail.

Electric trains typically are powered by current that is conducted to the train via an electrified rail. In the past, tubes have been bolted to the web of the rail, power conductors have been inserted into these tubes, and the tubes have then been crimped to secure the power conductors in place. This approach suffers from the disadvantage that the crimped tube may not in all cases provide a sufficient spring force to maintain the desired low-resistance electrical connection between the power conductor and the rail.

Thus, a need exists for an improved structure for connecting a railroad rail to a power conductor.

SUMMARY

By way of general introduction, the preferred embodiment described below includes a connector that is secured to the web of a railroad rail by a threaded fastener. The connector includes a first connector part having a first tail, a socket, and a first opening in the socket; and a second connector part having a second tail, a head rotatably received in the socket, and a second opening in the head. The second connector part is rotatable in the socket between an open position, in which the first and second openings are aligned (to allow a power conductor to be inserted into the connector), and a clamped position, in which the first and second openings are partially misaligned (to secure the power conductor in place in the connector). A threaded fastener holds the second connector part in the clamped position, and this threaded fastener includes an out-of-round head that is mechanically engaged with the connector to prevent relative rotation therebetween.

The preceding paragraphs have been provided by way of general introduction, and they are not intended to limit the scope of the following claims.

DETAILED DESCRIPTION OF THE PRESENTLY PREFERRED EMBODIMENTS

Figure 1:
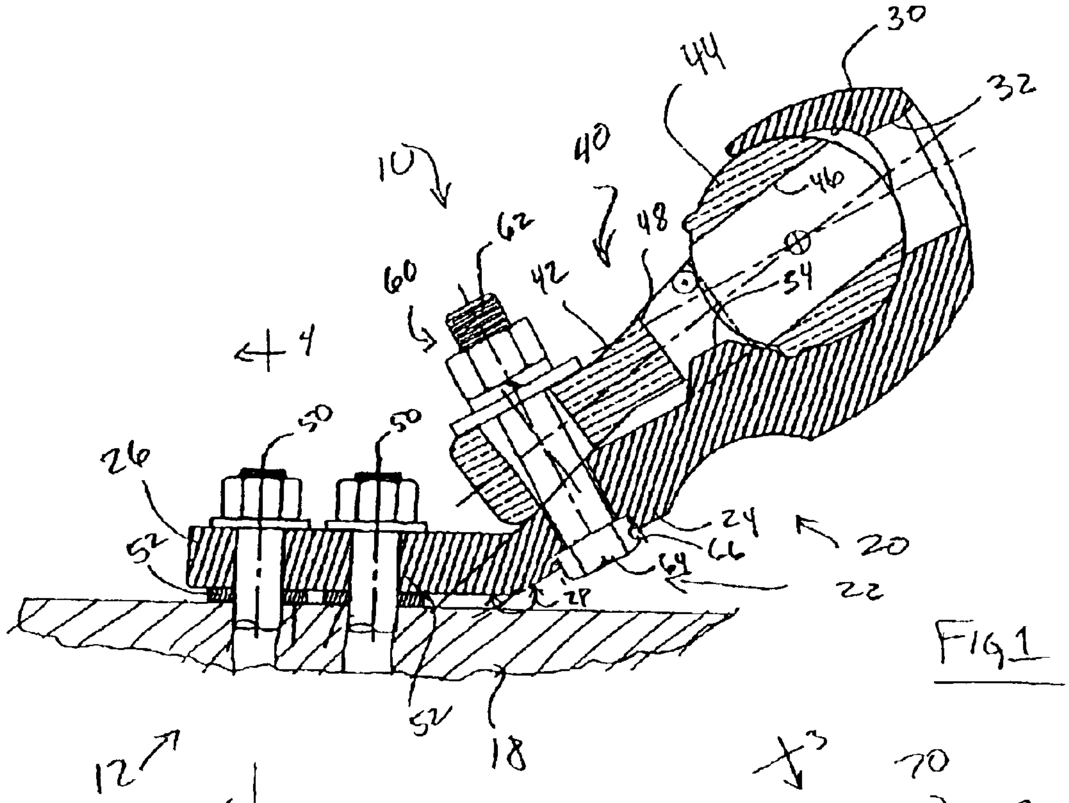
FIG. 1 is a fragmentary cross-sectional view of a railroad rail and an attached electrical connector in accordance with a preferred embodiment of this invention, showing the connector parts in a clamped position.
Figure 4:
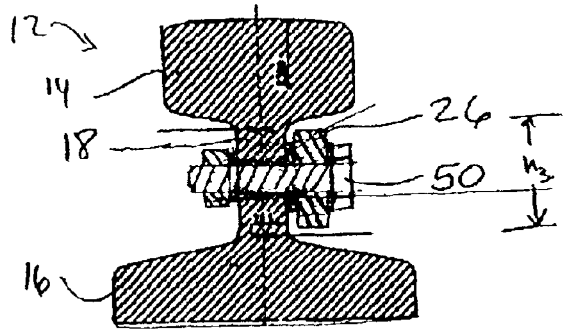
FIG. 4 is a cross-sectional view taken along line 4-4 of FIG. 1.

Turning now to the drawings, FIG. 1 illustrates a portion of a railroad rail 12 and an attached electrical connector 10. As shown in FIG. 4, the railroad rail 12 includes an upper flange 14, a lower flange 16, and a web 18 interconnecting the flanges 14, 16. The rail 12 per se forms no part of this invention, and any conventional railroad rail can be used.

As shown in FIG. 1, the connector 10 includes a first connector part 20 having a first tail 22. The first tail 22 is made up of a proximal portion 24 and a distal portion 26 that meet at an angle 28. In this example, the angle 28 is about 150°. This causes the proximal portion 24 to angle away from the web 18, when the distal portion 26 is held parallel to the surface of the web 18 by threaded fasteners 50. The first connector part 20 defines a socket 30 that is generally cylindrical in shape, and the socket 30 defines a first opening 32. The first connector part 20 also defines a protruding element 34.

A second connector part 40 includes a second tail 42 and a head 44. In this example, the head 44 is generally cylindrical in shape, and it is rotatably received within the socket 30. The second connector part 40 includes a second opening 46 that extends completely through the head 44 into the second tail 42, where it opens out above and below the second tail 42 at a window 48.

FIG. 1 shows the connector 10 mounted to the rail 12 by fasteners 50 passing through the web 18. Bushings 52 ensure good electrical contact between the first tail 22 and the web 18. As also shown in FIG. 1, a second fastener 60 extends through aligned openings in the first and second tails 22, 42 and secures the second connector part 40 in the clamped position of FIG. 1. In this example, the second fastener 60 includes a threaded bolt 62 having a head 64. The head 64 in this example is hexagonal in shape, though other out-of-round shapes can be used. The head 64 fits within a recess 66 in the proximal portion 24 to prevent relative rotation between the bolt 62 and the first connector part 20. The recess 66 can, for example, be formed as a slot in the surface of the proximal portion 24.

Figure 2:
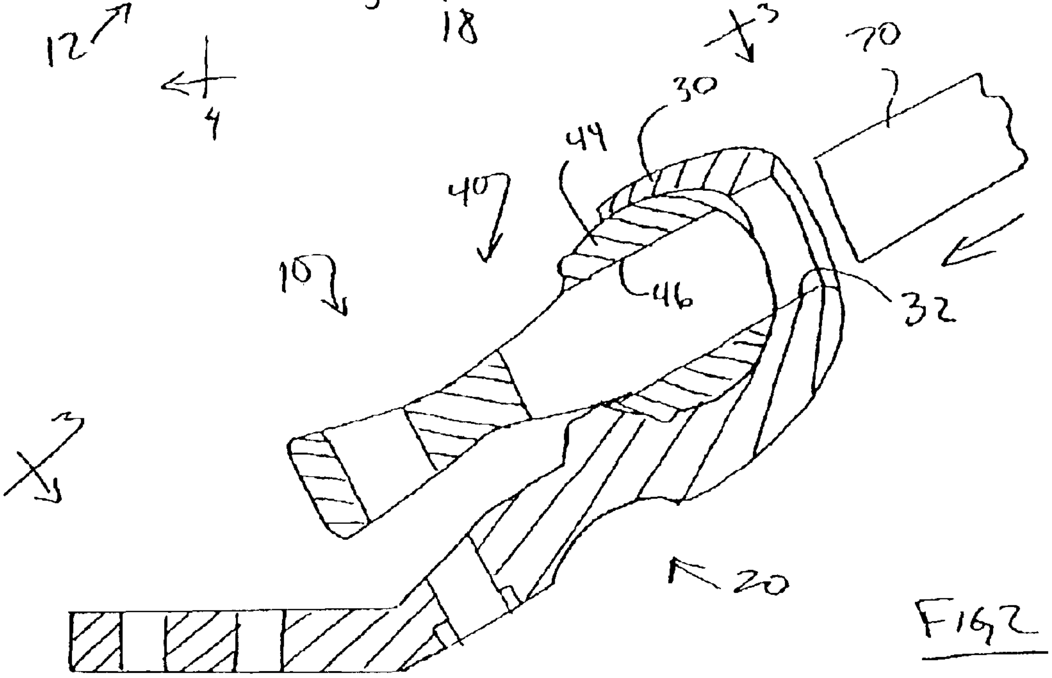
FIG. 2 is a cross-sectional view of the connector of FIG. 1, showing the connector parts in an open position.
Figure 3:
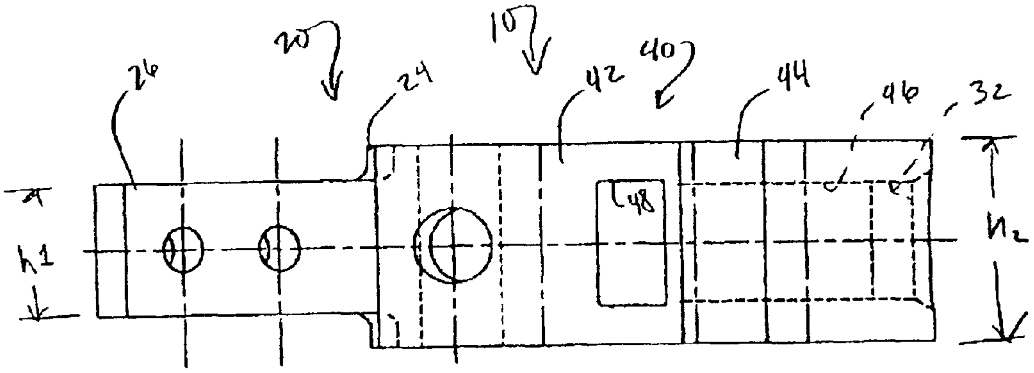
FIG. 3 is a top view taken along line 3-3 of FIG. 2.

FIG. 3 is a top view taken along line 3-3 of FIG. 2, and it illustrates the manner in which the proximal portion 24 is wider than the distal portion 26 in this example. In this example, the parts of the connector 10 below the line 80 in FIG. 1 have a height h1 of about 50 mm (FIG. 3) and the parts above the line 80 have a height h2 of about 76 mm (FIG. 3). The narrower portion (which includes the distal portion 26, part of the proximal portion 24, and part of the second tail 42) is sized to fit between the flanges 14, 16, while the wider portion (which includes the socket 30 and the head 44) is sized to receive the conductor 70. Stated differently, the web height h3 (FIG. 4) is greater than h1 and less than h2. This allows the connector 10 to be mounted against the web 18 (FIG. 4) and still to be wide enough at the socket 30 and the head 44 to clamp a conventional power cable.

In use, the connector 10 is first assembled by placing the head 44 within the socket 30 and the second fastener 60 within the aligned openings in the first and second tails 22, 42. Then the distal portion 26 is electrically and mechanically secured to the web 18 by the threaded fasteners 50.

Next, the second connector part 40 is rotated to the open position of FIG. 2. This can be done by loosening the second fastener and rotating the second tail 42 away from the web 18 until the first and second openings 32, 46 are in general alignment as shown in FIG. 2. Once the connector 10 is in this position, an electrical conductor 70, which can be a conventional power cable, is then inserted into the connector 10 until it is fully seated in the second opening 46.

The second fastener 60 is then tightened as shown in FIG. 1 to move the second connector part 40 to the clamped position of FIG. 1. This movement of causes a partial misalignment of the first and second openings 32, 46 and movement of the protruding element 34 into the window 48. This securely clamps the electrical conductor in place. Because of the spring action provided by the first and second tails 22, 42 and by the second fastener 60, the connector 10 provides a long-term, low-resistance connection with the electrical conductor, in spite of vibration, corrosion and the like.

Of course, many changes and modifications can be made to the preferred connector described above. For example, the portions of connector 10 that contact the electrical conductor and the second fastener can be fabricated as described in any of the following U.S. Pat. Nos.: 4,357,068, 4,479,694, 4,548,462, 4,898,551 and 5,919,065. All of these patents are assigned to the assignee of the present invention, and are hereby incorporated by reference in their entirety. Any suitable conductive material can be used with the connector, but an aluminum alloy such as 6082-T6 is presently preferred.

As used here in the term "position" is intended broadly to encompass a range of positions, and the term "set" is intended broadly to encompass one or more elements.

The foregoing detailed description has discussed only a few of the many forms that this invention can take. This detailed description is therefore intended by way of illustration, and not by way of limitation. It is only the following claims, included all equivalents, that are intended to define the scope of this invention.

What is claimed is:

1. A railroad rail-connector assembly comprising:

a railroad rail comprising an upper flange and a lower flange interconnected by a web;

a first connector part comprising a first tail, a socket, and a first opening in the socket;

a second connector part comprising a second tail, a head rotatably received in the socket, and a second opening in the head, said second connector part rotatable in the socket between an open position, in which the first and second openings are aligned, and a clamped position, in which the first and second openings are partially misaligned;

a first fastener mechanically securing one of the tails to the web, thereby electrically coupling the associated connector part to the rail;

a second fastener passing through the first and second tails and operative to hold the second connector part in the clamped position;

wherein said first tail comprises a distal portion that extends beyond said second tail generally parallel to the web adjacent the first fastener, and wherein said first tail further comprises a proximal portion that angles away from the web near an end of said second tail remote from the head.

2. The invention of claim 1 wherein said first tail defines an angle of about 150° between the distal and proximal portions.

3. The invention of claim 1 wherein the web defines a web height measured between the flanges, wherein the socket and the head extend beyond the flanges and are characterized by a connector height greater than the web height, and wherein the distal portion is characterized by a distal portion height that is less than the web height.

4. The invention of claim 1 further comprising:

an electrical conductor received in the first and second openings and clamped between the first and second connector parts.

5. The invention of claim 1 wherein the second opening extends into the second tail, and wherein the first tail comprises a protruding element positioned to fit into the second opening when the second connector part is in the clamped position.

6. A railroad rail-connector assembly comprising:

a railroad rail comprising an upper flange and a lower flange interconnected by a web;

a first connector part comprising a first tail, a socket, and a first opening in the socket;

a second connector part comprising a second tail, a head rotatably received in the socket, and a second opening in the head, said second connector part rotatable in the socket between an open position, in which the first and second openings are aligned, and a clamped position, in which the first and second openings are partially misaligned;

a first fastener mechanically securing one of the tails to the web, thereby electrically coupling the associated connector part to the rail;

a second fastener passing through the first and second tails and operative to hold the second connector part in the clamped position, wherein the second fastener comprises a threaded bolt comprising a non-round head, and wherein the head is mechanically engaged with the first tail adjacent the rail to prevent rotation of the bold relative to the connector parts.

* * * * *